(12) United States Patent
Suzuki

(10) Patent No.: US 7,111,531 B1
(45) Date of Patent: Sep. 26, 2006

(54) SCREW AND SCREWDRIVER

(75) Inventor: Yasuo Suzuki, Asaka (JP)

(73) Assignee: Kabushiki Kaisha Suzuki Rashi Seisakusho, Asaka (JP)

( * ) Notice: Subject to any disclaimer, the term of this patent is extended or adjusted under 35 U.S.C. 154(b) by 0 days.

(21) Appl. No.: 11/480,425

(22) Filed: Jul. 5, 2006

Related U.S. Application Data

(62) Division of application No. 11/102,634, filed on Apr. 11, 2005.

(51) Int. Cl.
*B25B 23/02* (2006.01)
*B25B 23/10* (2006.01)

(52) U.S. Cl. .......................................... 81/460; 81/441

(58) Field of Classification Search .................. 81/441, 81/460
See application file for complete search history.

(56) References Cited

U.S. PATENT DOCUMENTS

| | | | |
|---|---|---|---|
| 2,445,525 A * | 7/1948 | Gulden | 411/404 |
| 3,122,963 A * | 3/1964 | Borgesen | 411/404 |
| 4,355,552 A * | 10/1982 | Gutshall | 81/460 |
| 6,164,171 A * | 12/2000 | Kaneko et al. | 81/460 |
| 6,453,781 B1 * | 9/2002 | Casino Lorite et al. | 81/460 |

FOREIGN PATENT DOCUMENTS

| | | | |
|---|---|---|---|
| GB | 2111886 A | * | 7/1983 |
| JP | S57-120714 | | 7/1982 |

* cited by examiner

*Primary Examiner*—David B. Thomas
(74) *Attorney, Agent, or Firm*—Lau & Associates

(57) ABSTRACT

A screw and a screwdriver of the present invention provide an easy insertion of screwdriver bits and the screwdriver conveys a large torque when fastening so that the screwdriver does not rise up from the screw and does not damage recesses to fasten and loosen the screw. The screw has a high strength structure for shear force. A plurality of recesses for the insertion of the bits of the screwdriver are disposed on a top face of a screw head of the screw. Engaging walls are disposed to engage with the bits between the recesses. The whole shape of the recesses has a tapered cross section. Vertical engaging faces are formed inside the recesses near an outer circumference in a fastening direction of the screw and extend to a thickness direction of the screw head. The vertical engaging faces are parallel to bisectors of the width of the engaging walls through a central axis. The screwdriver has the bits having the same shape as the recesses of the screw head with respect to the central axis. The bits have vertical engaging drive faces to engage with the vertical engaging faces.

3 Claims, 6 Drawing Sheets

SCREW AND SCREWDRIVER

This is a divisional application based on U.S. patent application Ser. No. 11/102,634 filed on Apr. 11, 2005.

BACKGROUND OF THE INVENTION

1. Field of the Invention

The present invention relates to a screw and a screwdriver, and more particularly to use for attachment of parts of, for example, home electric appliances, electric device parts, office machines such as copying machines, and optical apparatus or precision apparatus such as digital camera.

2. Description of the Related Art

Recesses (holes) are disposed on a top surface of a screw in order to fasten and loosen the screw. Screwdriver bits engage with the recesses and a torque is conveyed to the recesses from the screwdriver.

The recesses are arranged in minus shape, cross shape or Y shape at the top of the screw and are called minus screw, cross screw or Y screw.

Among these screws, a minus screw has a simple structure and shape, and has a good workability for the production. However, from the viewpoint of the strength of the screw, deep recesses, which extend to the total thickness of the screw head, cannot be formed. Shallow recesses each give a small engaging portion and small area for the screwdriver bit. Then, when the screwdriver bits are inserted into the recesses and fasten the screw, a large torque and force can not be attained. The screwdriver bits are easily disengaged from the recesses disposed in the screw head. As a result, the screwdriver bits spin free in the recesses of the screw head and damage the recesses, and the screwdriver can not fasten enough the screw. It happens unable to loosen the screw. Furthermore, it is difficult to insert the screwdriver into the recesses and causes an inefficient workability.

Recesses in a cross screw head each have a tapered cross section and the depth of the recesses can be made deeper so that the recesses each can ensure a wide engaging area with a screwdriver, and a large torque and force from the screwdriver is attained. Then, the fast and assured fastening and loosening become possible. The screwdriver can be easily inserted into the recesses and attain a good operation. However, when the screwdriver is inserted into the recesses of the cross screw and a large torque is applied to the screw, the screwdriver bits happen to rise up and disengage from the recesses, spin free, and damage the recesses.

The volume of the cross screw becomes small as the number and space of the recesses become larger. The engaging area of the recesses with the screwdriver bits becomes wide so that only small shear force is attained. Then, the structure and strength of the screw become weak and lower, respectively.

Recently, the screws utilized especially for home electric appliances, electric device parts, office machines such as copying machines, and optical apparatus or precision apparatus such as digital camera, tend to have a large head, and a thin and small size in order to attain a large fastening torque. The advantage and disadvantage of the cross or minus screw become more distinct.

In order to increase the torque to fasten the cross or minus screws, a vertical wall is disposed in one side of the recess and a spherical or inclined wall is disposed in the other side of the recess of the large screw head, respectively. In order to prevent users from disassembling the screws, there is a screw such that no torque is applied to the direction to loosen. Refer to JP,57-120714,A(1982).

SUMMARY OF THE INVENTION

The present invention is to provide a screw and a screwdriver. Recesses of a screw head each have a tapered cross section for an insertion of screwdriver bits. A vertical engaging face is disposed in an inner side near a circumference of the recess of a fastening direction, and is parallel to a bisector of a width of an engaging wall to engage with the screwdriver bit. Thereby, the screw head becomes large and thin and the screw becomes also small size and the screwdriver bits easily enter into the desired places so that the workability increases. As a result, a large torque is conveyed to the screw from the screwdriver when fastening and the screwdriver bits do not spin free due to an accidental rising up and do not damage the recesses. The screwdriver fastens and loosens quickly and assuredly the screw. The screw has a robust and high strength structure for shear force. Moreover, the life of the screwdriver becomes long.

According to the invention as claimed in claim 1, a plurality of recesses are disposed at a top surface of a large screw head of a screw portion radially with respect to a central axis. An engaging wall is disposed between the recesses and engages with the screwdriver bit. The recess has a tapered cross section. A vertical engaging face is arranged in at least one inner side of the recess near an outer circumference in a fastening direction and extends to a thickness direction of the screw head. The vertical engaging face is parallel to a bisector of an circumferential width of the engaging wall through a central axis.

Preferably, the recesses each extend from the top face of the screw head to the screw portion and has the tapered cross section having an inclined face inside the outer circumference.

Preferably, the plurality of the recesses may be formed in Y shape, cross shape, pentagonal shape, hexagonal shape or octagonal shape at the screw head symmetrically to the central axis.

Preferably, a diameter of the recesses is almost same as a diameter of the screw portion.

Preferably, the vertical engaging face is a triangle shape and intersects with the inclined face from the top of the screw head and extends to deeper than half of the thickness of the screw head.

Preferably, the vertical engaging face is formed in a front side of the fastening direction or a back side of a loosening direction, or is formed in both front and back sides.

A plurality of bits with a tapered cross section each having an inclined portion are disposed symmetrically with respect to a central axis. The bit has a vertical engaging drive face formed in a side near an outer circumference in the fastening direction. The vertical engaging drive face is parallel to a bisector of a circumferential width through a central axis. The vertical engaging drive face engages with the vertical engaging face arranged in the recess of the screw head which has the same shape and number as the bit.

Preferably, the plurality of the bits are formed symmetrically with respect to the central axis in Y shape, cross shape, pentagonal shape, hexagonal shape and octagonal shape when viewed from the bottom. Each bit has an inclined portion and the whole shape of the bits has a tapered cross section.

Preferably, the vertical engaging drive face is formed in a triangle shape which intersects the inclined portion.

DETAILED DESCRIPTION OF THE PREFERRED EMBODIMENT

Figure 1:
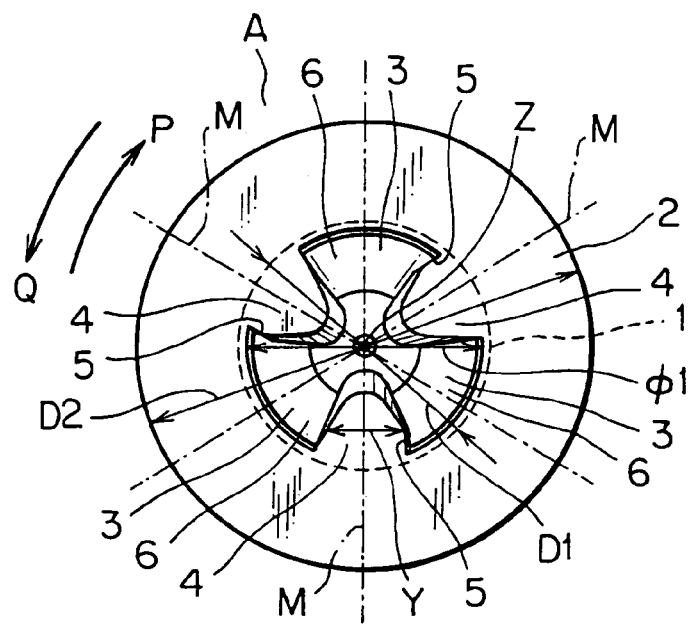
FIG. 1 is a plan view showing an embodiment 1 of a screw of the present invention.
Figure 3:
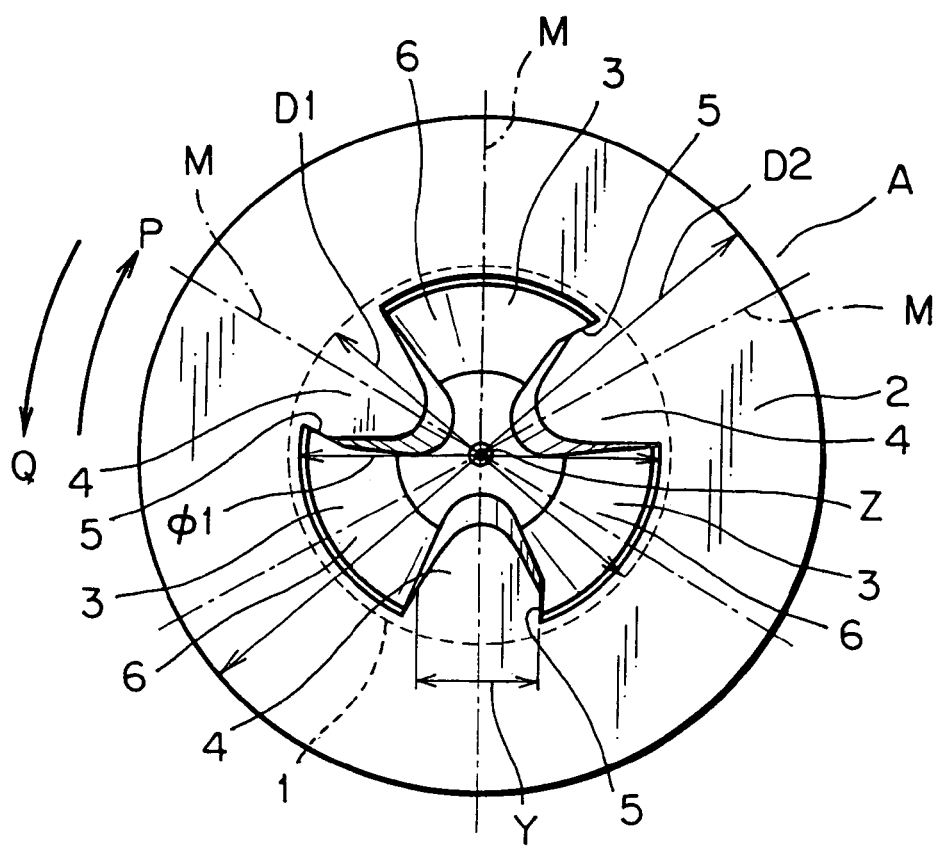
FIG. 3 is an expanded plan view showing the embodiment 1 of the screw of the present invention.

A screw of an embodiment 1 is denoted as A. The screw A has a plurality of recesses 3 on a screw head 2, which is large compared to a screw portion 1, in a radial direction from a central axis Z and has engaging walls 4 between the recesses 3. In the embodiment 1, as shown in FIGS. 1 and 3, the three recesses 3 are arranged in Y shape with angle of 120 degrees between each recess. Bits 8 of a screwdriver B are inserted into the recesses 3 and are engaged with the engaging walls 4 as described in JP,S57-120714,A.

Figure 2:
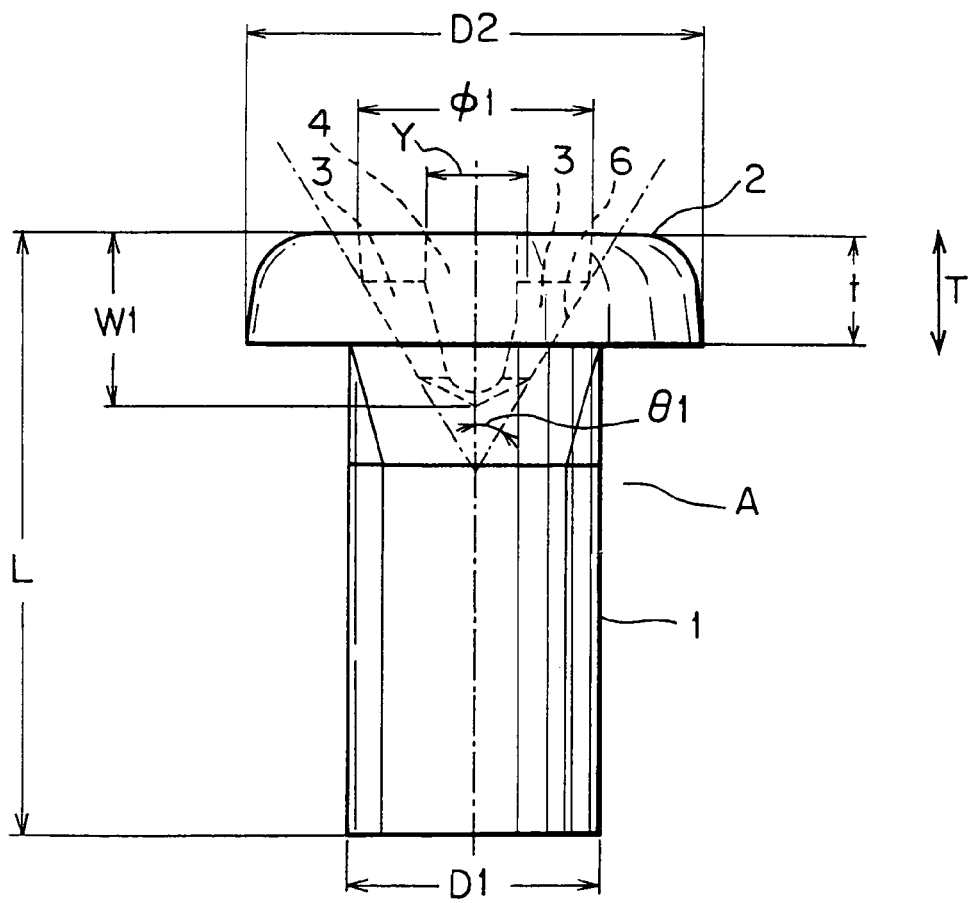
FIG. 2 is a front view showing the embodiment 1 of the screw of the present invention.
Figure 4:
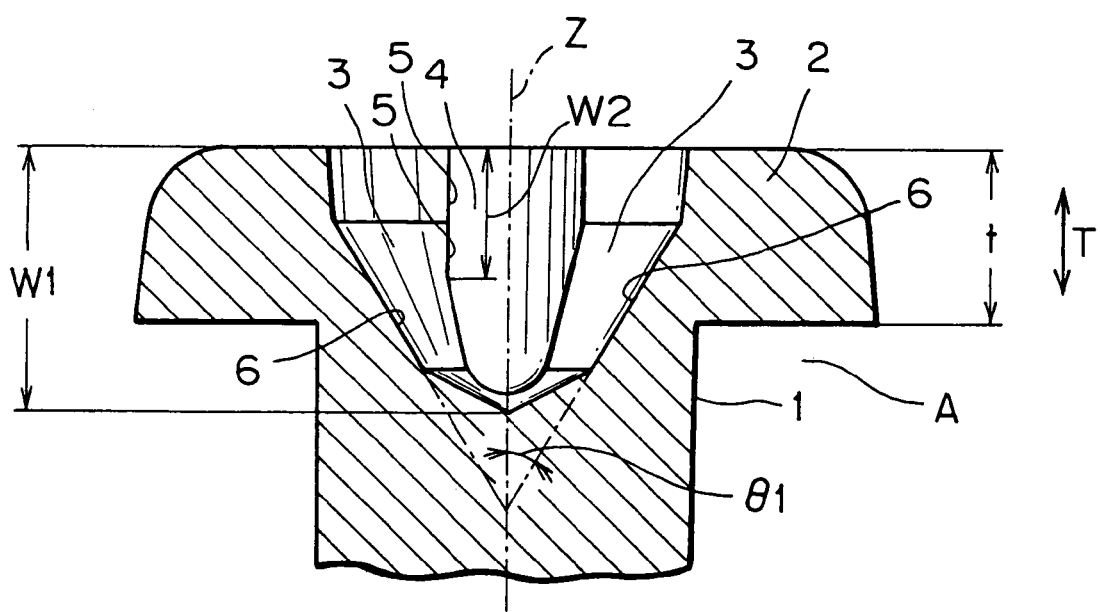
FIG. 4 is an expanded sectional view showing the embodiment 1 of the screw of the present invention.

The whole shape of the recesses 3 has a tapered cross section. Vertical engaging faces 5 are disposed in at least front or back face in the recesses near an outer circumference of a fastening direction P. FIGS. 1 and 3 show the case of the front face. The vertical engaging faces 5 each are parallel to a bisector M of a circumferetial width Y of the engaging wall 4 through the central axis Z and extend into a thickness direction T of the screw head 2. The recesses 3 extend from the top face of the screw head 2 to the screw portion 1 and have inclined faces 6, which have angle θ1 of about 30 to 45 degrees (in case of FIGS. 2 and 4, θ1 is about 30 degrees) with respect to the central axis Z, in the interior circumference. The whole shape of the recesses 3 has a tapered cross section. A diameter φ1 of the whole recesses 3 is comparable to an outer diameter D1 of the screw portion 1. In the embodiment 1, a depth W1 of the recess 3 is deeper than a thickness t of the screw head 2.

The vertical engaging faces 5 extend from the top face of the screw head 2 and intersect with the inclined faces 6. The front shape of the vertical engaging face 5 is generally triangle and a depth W2 of the vertical engaging face 5 is deeper than half of t of the thickness of the screw head 2.

Figure 5:
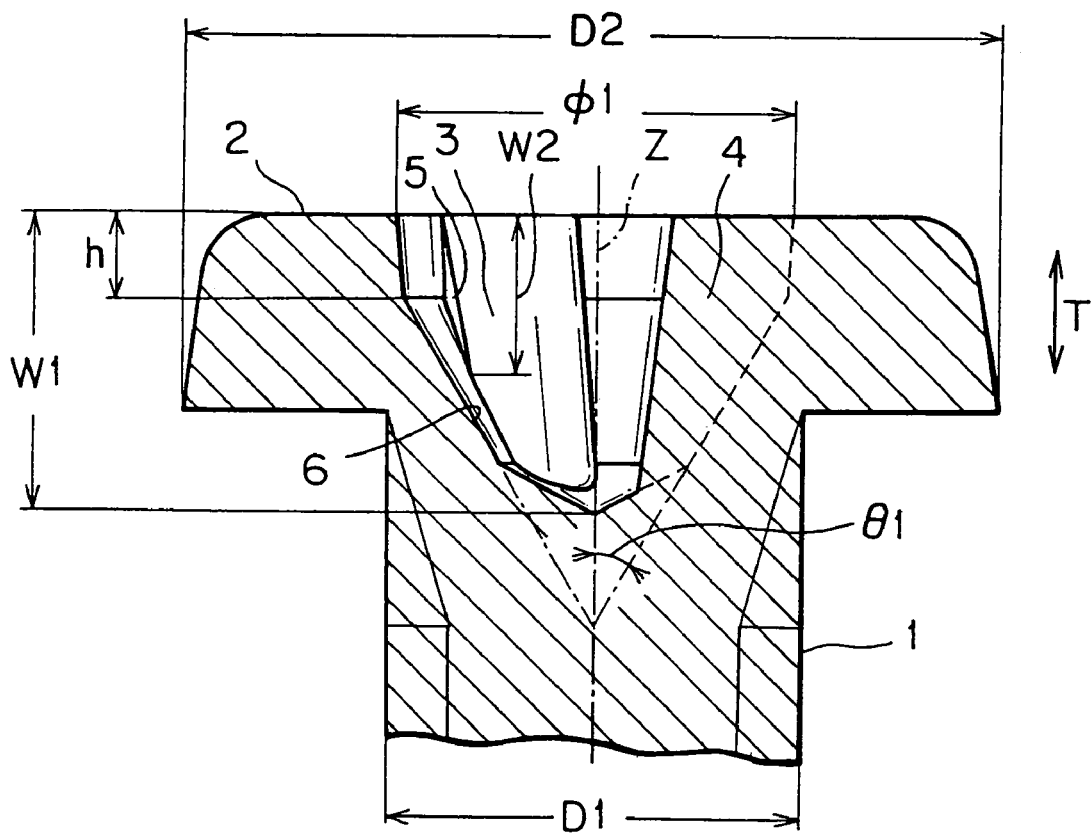
FIG. 5 is an expanded sectional view of a different direction from FIG. 4.

In the embodiment 1, h is a height of the vertical engaging face 5 (refer to FIG. 5).

Figure 6:
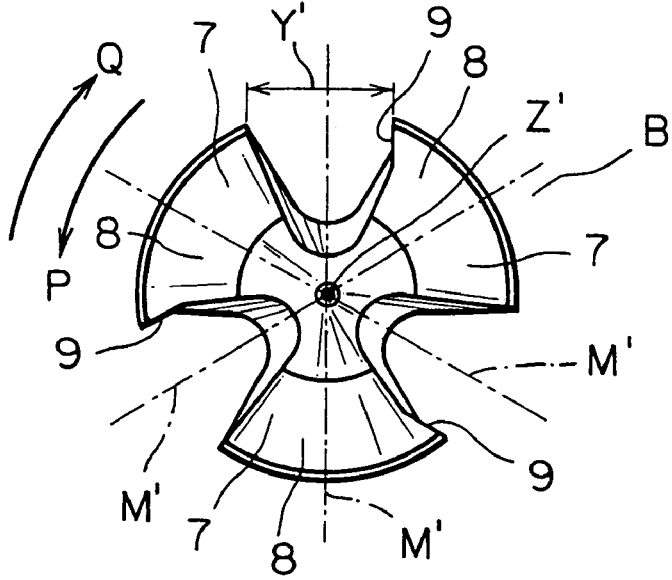
FIG. 6 is an expanded plan view of a screwdriver utilized for the screw of the present invention.
Figure 7:
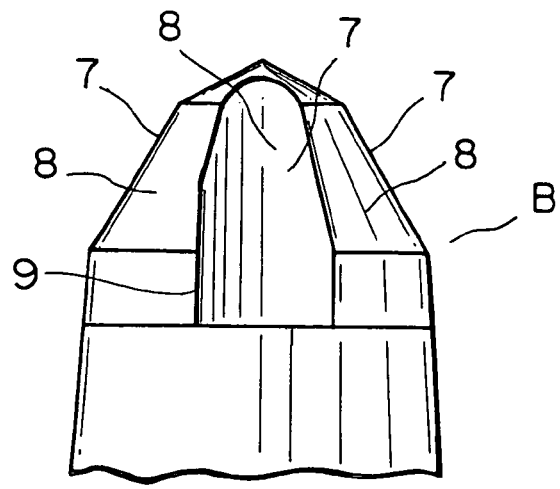
FIG. 7 is an expanded front view of the screwdriver.
Figure 8:
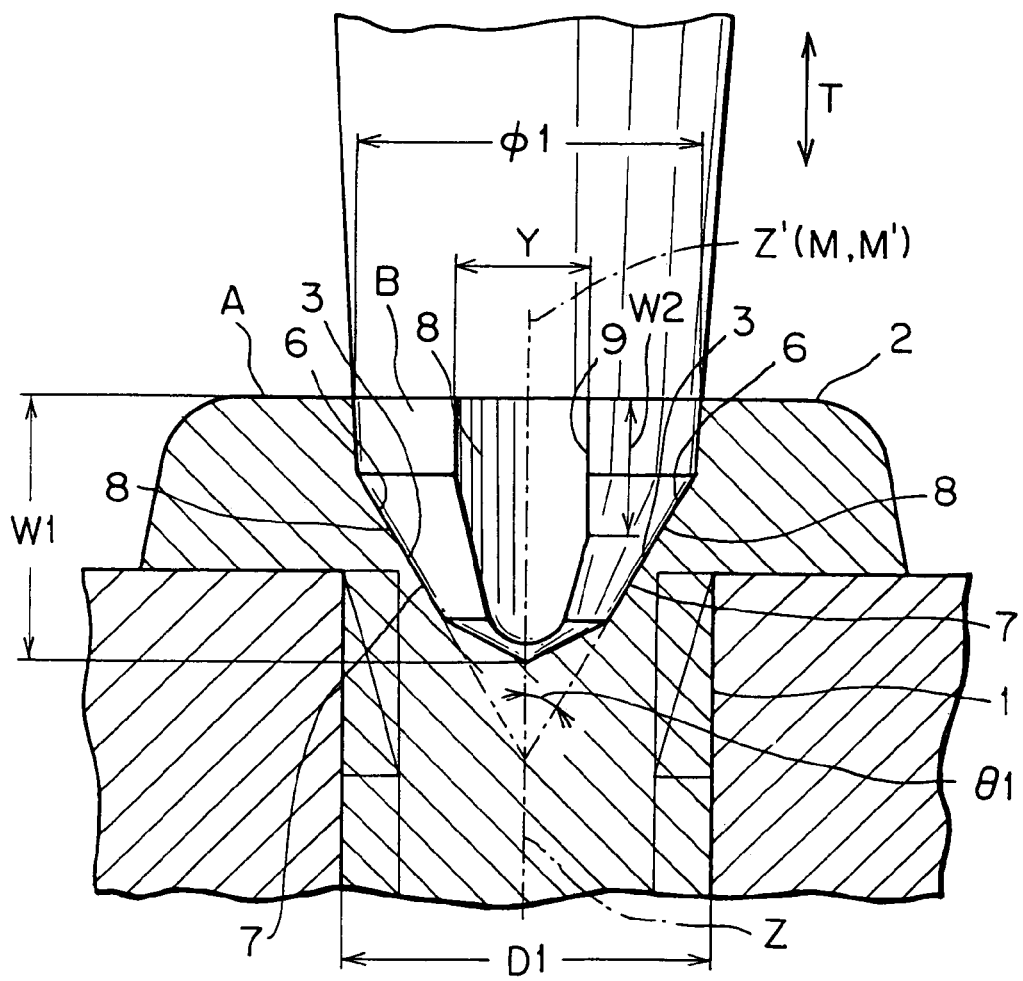
FIG. 8 is an expanded sectional view of the use of the screwdriver.

The screwdriver B is especially used to fasten and loosen the screw A. The screwdriver B has inclined portions 7 with angle of about 30 to 45 degrees with respect to a central axis Z', similar to the shape of the recess 3. The screwdriver B has the plurality of the bits 8 having a tapered cross section, which are arranged symmetrically with respect to the central axis Z'. In FIG. 6, the three bits are arranged each other with angle of 120 degrees. The bit 8 has a vertical engaging drive face 9 with a triangle shape, viewed from the front, near the outer circumference at the back side of the fastening direction P or the front side of a loosening direction Q. The vertical engaging drive face 9 is parallel to a bisector M' of a width Y' of the bit 8 through the central axis Z'.

The vertical engaging drive faces 9 engage with the vertical engaging faces 5, which are disposed near the outer circumference of the recesses 3 of the screw head 2 and have the same number and shape as the bits 8, so that a large torque is conveyed to the vertical engaging faces 5 of the screw A with outer circumference couple.

The screwdriver B is utilized for fastening the screw A. The number of bits 8 corresponds with that of the recesses 3. Three bits 8 of the screwdriver B are inserted into the three recesses 3.

The recesses 3 disposed in the top face of the screw head 2 extend to the screw portion 1 along the central axis Z of the screw A. The inclined faces 6 having the angle θ1 of about 30 to 45 degrees with respect to the central axis Z have tapered shape in the inner circumference of the recesses 3. The bits 8 of the screwdriver B have the inclined portions 7 having the angle of about 30 to 45 degrees with respect to the central axis Z' and have the same shape and number as the recesses 3. For this reason, the three bits 8 of the screwdriver B are quickly and correctly inserted into the three recesses 3 of the screw A by a one-touch and simple operation and penetrate to the depth W1 deeper than the thickness of the screw head 2.

After the screwdriver B is inserted into the recesses 3, it is rotated to the fastening direction P. The screw A is fastened into the direction P by the three bits 8 formed in Y shape at the bottom of the screwdriver B.

The vertical engaging faces 5, which intersect with the inclined faces 6, are rotated to the fastening direction P in FIGS. 1 and 3 by the bits 8 of the screwdriver B. The lower half of the inclined portions 7 of the screwdriver B fit to the inclined faces 6 of the screw A when the screwdriver B is inserted into the recesses 3 and conveys an effective torque to the screw A through the bits 8.

The vertical engaging drive faces 9 of the screwdriver bits 8 engage with the vertical engaging faces 5 of the recesses 3 in a plenty area. A force couple is affected at the three points of the outer circumference of the screwdriver B so that an effectively large torque is conveyed to the vertical engaging faces 5 with a small rotation force and the screw A is easily rotated to fasten strongly.

Since the vertical engaging drive faces 9 engages with the vertical engaging faces 5, even when a large torque is applied to the screwdriver B when fastening the screw A, it is prevented the screwdriver B from rising up from the screw A. Then, the screwdriver B does not spin improperly inside the recesses 3 and does not damage the recesses 3 so that the screwdriver B fastens the screw A fast and assuredly with high accuracy.

The recesses 3 in the screw head 2 have the tapered cross section and have the inclined faces 6 having the angle θ1 of about 30 to 45 degrees with respect to the central axis Z inside. The depth W1 extending from the top face of the screw head 2 to the screw portion 1 is deeper than the thickness t of the screw head 2.

The recesses 3 with the diameter φ1 comparable to the outer diameter D1 of the screw portion 1 are formed in the screw head 2. For this reason, even when the number of the recesses 3 increases and the space volume is more required, the thickness of the neck of the screw portion 1 at the screw head 2 is kept properly and the screw A of the embodiment has a robust and strong structure.

Accordingly, even when the screw head 2 becomes much larger than the screw portion 1 and becomes thinner, and the screw A becomes smaller, the screw A is not fractured or damaged by a large torque applied by the screwdriver B so that a large shear force is attained. The screw A attains higher robust and strength structure and a more wide engaging area with the screwdriver bits 3 so that the screw A is fastened fast and assuredly.

In the embodiment 1, the depth W1 of the recesses 3 is deeper than the thickness t of the screw head 2 and extends to the screw portion 1. The vertical engaging faces 5 having a triangle shape with the height h is formed to extend to the depth W2 which is deeper than half of the thickness t of the screw head 2 (refer to FIG. 5). Accordingly, a large engaging area is assured for the screwdriver B. Then, when the screw head 2 becomes much larger than the screw portion 1 and becomes thinner, and the screw A becomes smaller, a large torque can be applied by the screwdriver B to the screw A. Then, a large engaging area to the screwdriver bit 8 is kept and a large shear force is attained so that the screw A attains higher robust and strength structure and is fastened strongly by the screwdriver B.

In order to loosen the screw A, the screwdriver bits 8 are easily and quickly inserted into the recesses 3 by one-touch operation.

The screwdriver bits 8 are rotated toward the loosening direction Q so that the inclined portions 7 face the inclined faces 6 and an effective torque is conveyed to loosen the screw A.

If the screw A is loosened by a screwdriver, which is not the screwdriver B, the screwdriver bits do not fit with the inclined faces 6 of the recesses 3 of the embodiment 1. Then the torque is not correctly conveyed so that the screwdriver spins free inside the recesses 3 and damages the recesses. For this reason, the screw A is not rotated to the loosening direction Q and can not be loosened.

Figure 9:
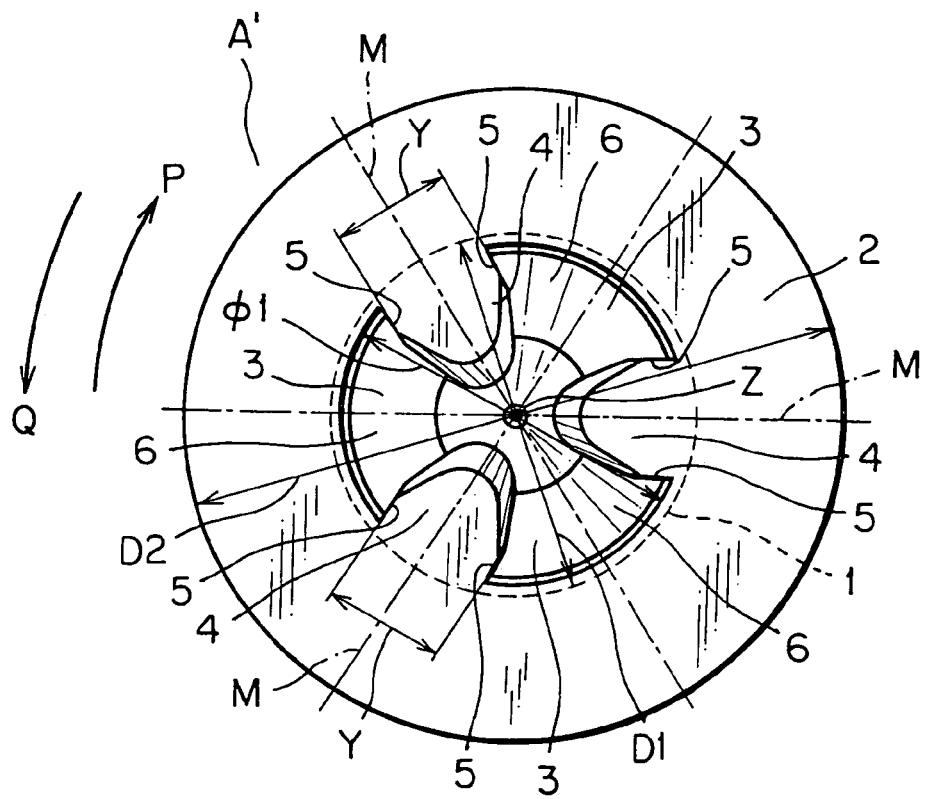
FIG. 9 is an expanded plan view showing an embodiment 2 of the screw of the present invention.
Figure 10:
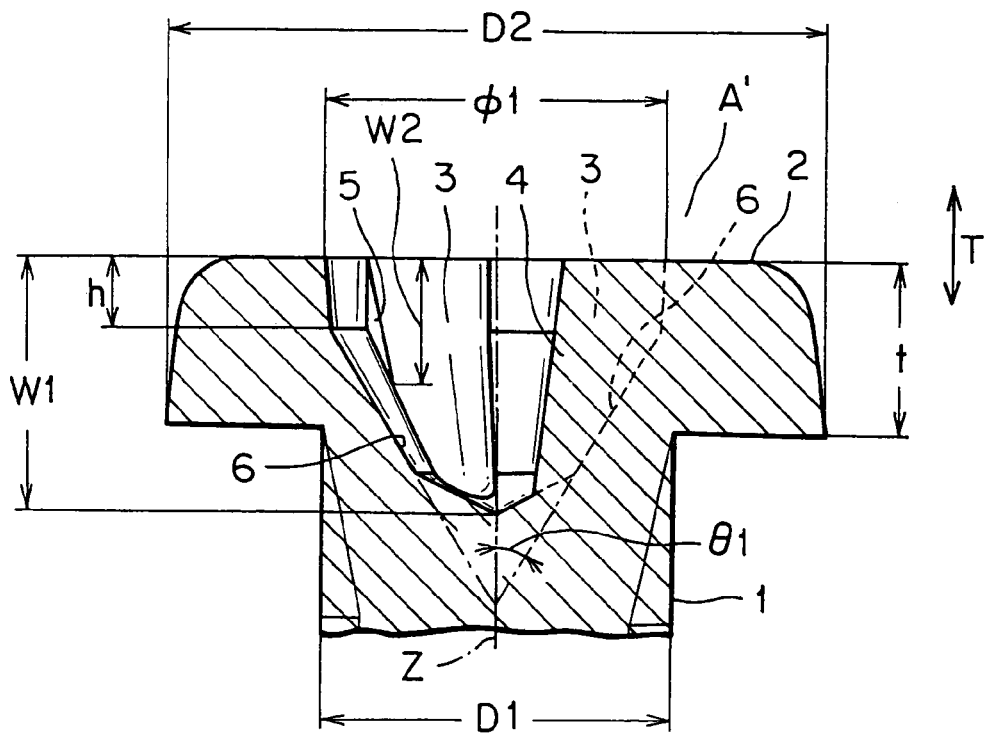
FIG. 10 is an expanded sectional view showing the embodiment 2 of the screw of the present invention.

FIGS. 9 and 10 are a second embodiment of the present invention. In this embodiment, the vertical engaging faces 5 of a triangle shape are formed in the front sides of the fastening direction P and in the back sides of the loosening direction Q in the recesses 3 of the screw head 2 of the screw A'.

The screwdriver (not shown) to fasten and loosen the screw A' has also the vertical engaging drive faces 9 engageable with the vertical engaging faces 5 in the front sides of the fastening direction P and in the back sides of the loosening direction Q near the outer circumference.

The three bits 8 of the screwdriver are inserted into the three recesses 3. The vertical engaging drive faces 9 are engaged with the vertical engaging faces 5 to fasten the screw A' in the direction P or to loosen it in the direction Q.

Figure 11:
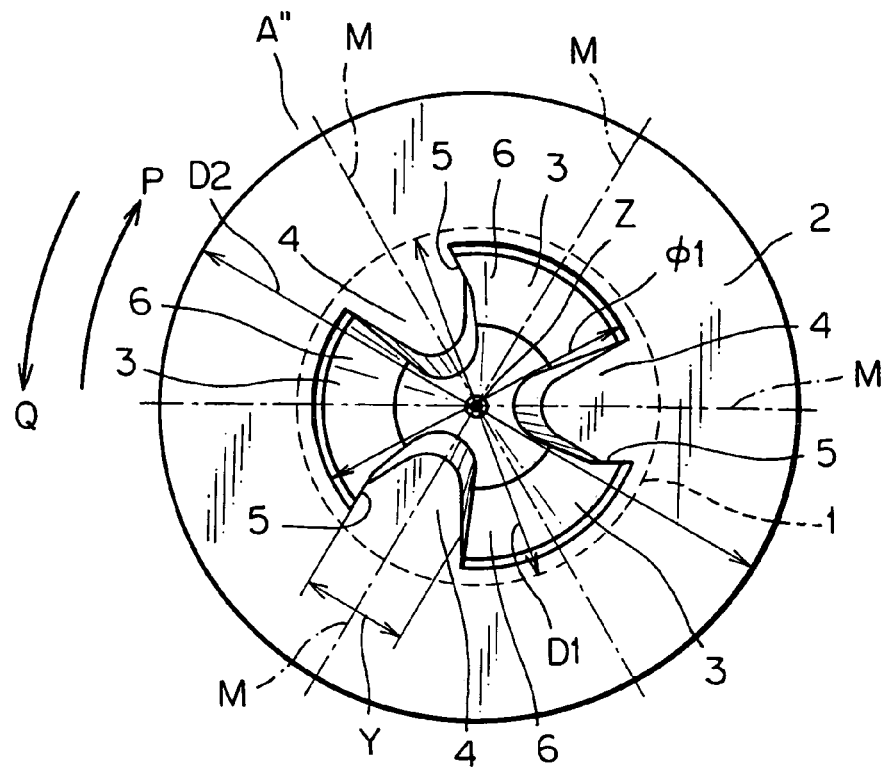
FIG. 11 is an expanded plan view showing an embodiment 3 of the screw of the present invention.
Figure 12:
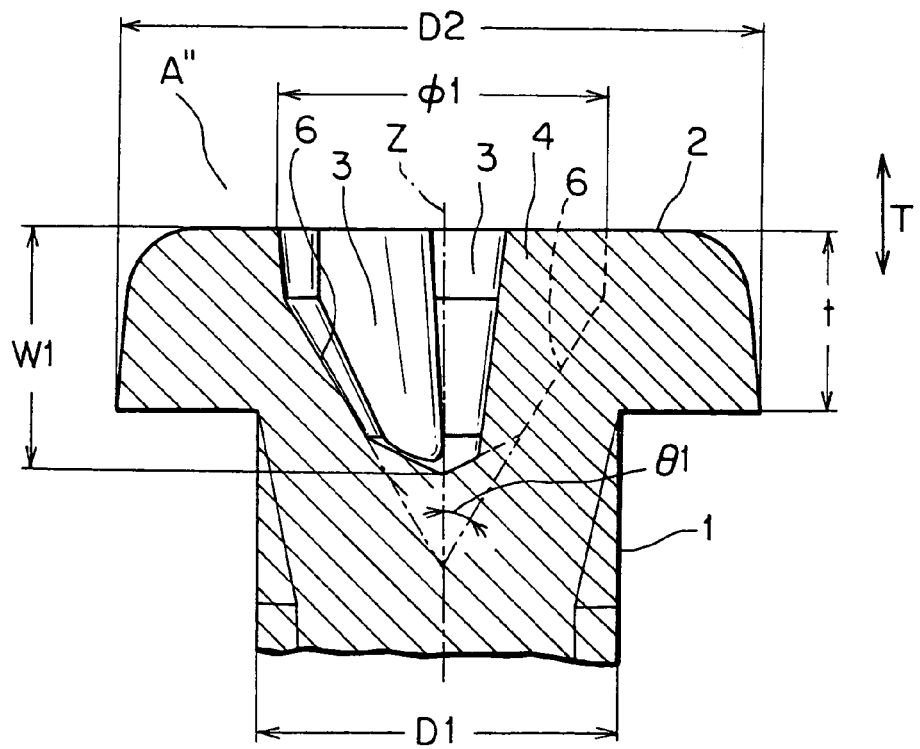
FIG. 12 is an expanded sectional view showing the embodiment 3 of the screw of the present invention.

FIGS. 11 and 12 show a third embodiment of the present invention.

In the third embodiment, the vertical engaging faces 5 in the recesses 3 on the screw head 2 of the screw A" are formed near an outer circumference in the back side of the loosening direction Q.

The screwdriver to fasten and loosen the screw A" has the vertical engaging drive faces 9, which are engageable with the vertical engaging faces 5 in the recesses 3 having the same shape and number as the bits 8, near the outer circumference in the back side of the loosening direction Q.

The screwdriver (not shown) having the three bits 8 is inserted into the three recesses 3 of the screw head 2 of the screw A" and is rotated to fasten or loosen the screw A" in the direction P or Q, respectively. When rotated to the fastening direction P, the inclined portions 7 of the screwdriver bits 8 match with the inclined faces 6 of the recesses 3 and a large torque is easily and assuredly conveyed to the screw A". When rotated to the loosening direction Q, the vertical engaging drive faces 9 match with the vertical engaging faces 5 and a fast and assured loosening of the screw A" is made without rising up and free spin of the bits 8.

In the above embodiments 1, 2 and 3, the screws A, A' and A" have the recesses 3 on the screw head 2 of the screw portion 1. The vertical engaging faces 5 are disposed in the front sides of the fastening direction P or the back sides of the loosening direction Q, or is disposed in both front and back sides. The bits 8 of the screwdriver have the vertical engaging drive faces 9 to engage with the vertical engaging faces 5 of the screw A, A' and A". The vertical engaging drive faces 9 are disposed in the back sides of the fastening direction P or the front sides of the loosening direction Q, or are disposed in both front and back sides.

The above embodiments are only explanatory. For example, the plurality of the recesses 3 on the screw head 2 may be arranged symmetrically at the central axis Z and have a cross shape, pentagonal shape, hexagonal shape and octagonal shape, and the vertical engaging faces 5 may be disposed in the front side of the fastening direction P or the back side of the loosening direction Q, or is disposed in both front and back sides. The screwdrivers to fasten or loosen these screws may also have the bits 8 corresponding to the number and shape of the recesses. The vertical engaging drive faces 9 to engage with the vertical engaging faces may be disposed in the back side of the fastening direction P or the front side of the loosening direction Q, or is disposed in both front and back sides.

The present invention is not limited to the embodiments shown in the drawings. The diameter D2 and thickness t of the screw head 2, the diameter D1 of the screw portion 1, the depth W1 of the tapered recesses 3 and further the shape thereof may be modified.

What is claimed is:

1. A screwdriver comprising:
   a plurality of bits arranged radially about a central axis, wherein each bit has a tapered cross section, inclined portions at the outside, and vertical engaging drive faces at the outside near an outer periphery in a fastening direction, the vertical engaging drive faces are in parallel to a bisector of peripheral widths of the adjacent bits passing through a central axis, and the vertical engaging drive faces are engageable with the vertical engaging faces disposed in the proximity of the outer periphery of the recesses having a same shape and number of corresponding bits so that a large torque is conveyed to the periphery.

2. The screwdriver as claimed in claim 1, wherein said plurality of the bits are formed in Y-shape, cross shape, pentagonal shape, hexagonal shape, or octagonal shape symmetrically at the central axis and have a tapered cross section and inclined portions with respect to the central axis.

3. The screwdriver as claimed in claim 1, wherein said vertical engaging drive faces intersect the inclined portions and form a triangle shape in cross section.

* * * * *